United States Patent
Zhou et al.

(10) Patent No.: US 7,129,513 B2
(45) Date of Patent: Oct. 31, 2006

(54) FIELD EMISSION ION SOURCE BASED ON NANOSTRUCTURE-CONTAINING MATERIAL

(75) Inventors: Otto Z. Zhou, Chapel Hill, NC (US); Jianping Lu, Chapel Hill, NC (US); Changkun Dong, Chapel Hill, NC (US); Bo Gao, Burlington, NC (US)

(73) Assignee: Xintek, Inc., Chapel Hill, NC (US)

( * ) Notice: Subject to any disclaimer, the term of this patent is extended or adjusted under 35 U.S.C. 154(b) by 129 days.

(21) Appl. No.: 10/858,436

(22) Filed: Jun. 2, 2004

(65) Prior Publication Data

US 2005/0269559 A1    Dec. 8, 2005

(51) Int. Cl.
*H01L 29/06* (2006.01)
(52) U.S. Cl. .......................... 257/10; 257/13
(58) Field of Classification Search ............. 257/16–18
See application file for complete search history.

(56) References Cited

U.S. PATENT DOCUMENTS

| | | | |
|---|---|---|---|
| 4,318,029 A | 3/1982 | Jergenson | |
| 4,328,667 A | 5/1982 | Valentian et al. | |
| 4,367,429 A | 1/1983 | Wang et al. | |
| 4,496,843 A | 1/1985 | Kirita et al. | |
| 4,624,833 A | 11/1986 | Umemura et al. | |
| 4,638,210 A | 1/1987 | Jergenson | |
| 4,680,507 A | 7/1987 | Uemura et al. | |
| 4,733,134 A | 3/1988 | Tamura et al. | |
| 4,752,692 A | 6/1988 | Jergenson et al. | |
| 4,774,414 A | 9/1988 | Umemura et al. | |
| 5,034,612 A | 7/1991 | Ward et al. | |
| 5,138,220 A | 8/1992 | Kirkpatrick | |
| 5,397,901 A | 3/1995 | Lo | |
| 5,871,848 A | 2/1999 | Bozack et al. | |
| 5,936,251 A | 8/1999 | Gierak et al. | |
| 6,150,755 A | 11/2000 | Druz et al. | |
| 6,231,744 B1 | 5/2001 | Ying et al. | |
| 6,277,318 B1 | 8/2001 | Bower et al. | |
| 6,280,697 B1 | 8/2001 | Zhou et al. | |
| 6,359,288 B1 | 3/2002 | Ying et al. | |
| 6,761,871 B1 | 7/2004 | Little | |

(Continued)

OTHER PUBLICATIONS

B. Gao et al., "Electrochemical intercalation of single-walled carbon nanotubes with lithium", *Chem. Phys. Lett.*, vol. 307, Jul. 2, 1999, pp. 153-157.

(Continued)

*Primary Examiner*—Cuong Nguyen
(74) *Attorney, Agent, or Firm*—Jenkins, Wilson, Taylor & Hunt, P.A.

(57) ABSTRACT

A field emission ion source has nanostructure materials on at least an emitting edge of the anode electrode. Metal is transferred from a metal reservoir to the emitting edge of the anode, where the metal is transferred to an emitting end of the nanostructure materials and is ionized under an applied electric field. Plural ion sources can be combined to form a field emission ion source device. The numbers of emitting sources are selectable through electric or mechanical switches and different ion extraction potentials can be applied. Various nanostructure materials include: single wall carbon nanotubes and bundles, few-walled carbon nanotubes and bundles, multi-walled carbon nanotubes and bundles, and carbon fiber. Nanostructure-containing material is integrated into the anode by electrophoresis, dielectrophoresis, CVD, screen printing, and mechanical methods. Metal, preferably alkali metal, is transferred into the nanostructure-containing material by one or a combination of following intercalation methods: vapor transport, solution, electrochemical, and solid state reaction.

28 Claims, 4 Drawing Sheets

U.S. PATENT DOCUMENTS 6,885,010 B1 * 4/2005 Traynor et al. ............. 250/427

OTHER PUBLICATIONS

A. Thess et al., "Crystalline Ropes of Metallic Carbon Nanotubes", *Science*, vol. 273, Jul. 26, 1996, pp. 483-487.

T.W. Ebbesen et al., "Large scale synthesis of carbon nanotubes", *Nature*, vol. 358, Jul. 16, 1992, pp. 220-222.

A.M. Cassell et al., "Large Scale CVD Synthesis of Single-Walled Carbon Nanotubes", *J. Phys. Chem. B*, vol. 103, No. 31, Aug. 5, 1999, pp. 6484-6492.

S. Iijima, "Helical microtubles of graphitic carbon", Nature 354, Nov. 7, 1991, pp. 56-58.

M. Endo et al., "The production and structure of pyroltic carbon nanotubes (PCNTs)", *J. Phys. Chem. Solids*, vol. 54, No. 12, pp. 1841-1848, Dec. 1993.

B. Gao et al., "Fabrication and electron field emission properties of carbon nanotube films by electrophoretic deposition", *Adv. Mater.*, vol. 13, No. 23, Dec. 3, 2001, pp. 1770-1773.

J. Tang et al. "Assembly of 1D nanostructures into submicron diameter fibrils with controlled and variable length by dielectrophoresis", *Adv. Mater.*, vol. 15, No. 15, Aug. 5, 2003, pp. 1352-1355.

D. Guyomard, et al., "Li Metal-Free Rechargeable $LiMn_2O_4$/Carbon Cells: Their Understanding and Optimization", *J. Electrochem. Soc.*, vol. 139, No. 4, Apr. 1992, pp. 937-948.

L.A. Chernozatonskii, "Layer structures of covalently bound $C_{60}$ barrelenes and LB films", Chemical Physics Letters, Jul. 2, 1993, pp. 229-232, vol. 209, No. 3, Elsevier Science Publishers B.V., Oxford, UK.

D.A. Kirkpatrick et al., "Demonstration of vacuum field emission from a self-assembling biomolecular microstructure composite", Appl. Phys. Lett., Mar. 30, 1992, pp. 1556-1558, 60 (13), American Institute of Physics, Melville, NY.

S. Seraphin et al., "Yttrium carbide in nanotubes", Nature, Apr. 8, 1993, p. 503, vol. 362, No. 6420, Nature Publishing Group, Hampshire, United Kingdom.

S. Iijima et al., "Single-shell carbon nanotubes of 1-nm diameter", Nature, Jun. 17, 1993, vol. 363, pp. 603-605, Nature Publishing Group, Hampshire, United Kingdom.

P.M. Ajayan et al., "Capillarity-induced filling of carbon nanotubes", Nature, Jan. 28, 1993, pp. 333-334, vol. 361, Nature Publishing Group, Hampshire, United Kingdom.

* cited by examiner

FIELD EMISSION ION SOURCE BASED ON NANOSTRUCTURE-CONTAINING MATERIAL

FIELD OF THE DISCLOSURE

The present disclosure relates to a field emission ion source equipped with a field emission anode and an extraction electrode (cathode).

STATE OF THE ART

In the discussion of the state of the art that follows, reference is made to certain structures and/or methods. However, the following references should not be construed as an admission that these structures and/or methods constitute prior art. Applicants expressly reserve the right to demonstrate that such structures and/or methods do not qualify as prior art against the present invention.

One type of field emission ion source is a liquid metal ion source (LMIS). A LMIS, has an anode wetted by a liquid metal and an extraction electrode. The anode and extraction electrode are in a vacuum of typically below $10^{-4}$ Torr. An electrical field applied between the anode and the extraction electrode to produce a sufficiently high local electric field, typical in the order of about $10^9$ V/m, can result in field ion emission. The high electric field is created by the field enhancement on the sharp apex of the anode, which is normally on the order of approximately micrometers.

In a first conventional type of emitter structure, a sharp metal surface structure, such as a tungsten tip, extends out a liquid metal surface and serves as an ion emitting anode. This is a so-called liquid metal "Taylor cone" formed on the tip apex under high surface fields. The result is a dynamic equilibrium between field evaporation and hydrodynamic flow, resulting in the emission of a continuous, space charge limited ion beam from the cone apex. U.S. Pat. No. 4,318,029 describes a metal tip and an edge emitter based ion source. The ion source electrodes are normally made of metals. Non-metal conductive materials can also be used in the ion source, for example, anodes based on graphite material are disclosed in U.S. Pat. No. 5,936,251.

In a second conventional type of emitter structure, a liquid metal feeding channel is made of a narrow slit, which is formed by two sharp lips and typical has a micron dimension opening. U.S. Pat. No. 4,328,667 discloses an ion source of slits structure, wherein the discharge slit has a width of no more than 0.020 mm. Both straight and curved slits dimension are disclosed.

For most field emission ion sources, ions are emitted from the liquid metal. In U.S. Pat. No. 4,624,833, field emissions of non-metal ions including phosphor and boron are described.

LMIS has many potential applications. For example, LMIS exhibits excellent optical properties, like high brightness and low energy spread, which allow an LMIS ion source to be incorporated in focus beam based systems, such as Secondary Ion Mass Spectrometry (SIMS) and surface modification instruments. In space science, liquid metal ion sources have gained increasing attention for use in ion thrusters for attitude control and constellations in different scientific missions, due to considerable advantages from both weight and performance standpoints. Another space application of LMIS is the elimination of electrostatic charge accumulation on spacecraft. However, the performance and the application of LMIS could be improved by the use of nanostructure-based solution.

SUMMARY

An exemplary field emission ion source comprises a metal source reservoir containing a metal, a closure element over the metal source reservoir with a first side towards the metal source reservoir, a second side away from the metal source reservoir and an opening from the first side to the second side, and an anode base structure including an emitting edge and a metal ion supplying edge, at least the emitting edge including a nanostructure-containing material. The metal from the metal source reservoir is transferred to the emitting edge of the anode base structure and is further transferred to an emitting end of the nanostructure-containing material to be ionized.

An exemplary method of forming a field emission ion source comprises forming an anode base structure containing a nanostructure-containing material, the anode base structure including an emitting edge and a metal supplying edge and the nanostructure-containing material integrated into at least the emitting edge and positioning the anode base structure in a housing, the housing including a metal source reservoir for a metal and a closure element over the metal source reservoir with a first side of the closure element towards the metal source reservoir, a second side of the closure element away from the metal source reservoir and an opening in the closure element from the first side to the second side. The anode base structure is positioned with the anode base structure passing through the opening in the closure element with the metal supplying edge in metal transferring contact with the metal in the metal source reservoir and with the emitting edge protruding past the second side of the closure element. The metal from the metal source reservoir is transferred to the emitting edge of the anode base structure and is further transferred to an emitting end of the nanostructure-containing material to be ionized.

An exemplary method of field emitting an ion from a field emission ion source comprises transferring a metal from a liquid metal reservoir in contact with a metal supplying edge of an anode base structure to an emitting edge of the anode base structure within a material of the anode base structure, wherein a nanostructure-containing material is integrated into at least the emitting edge, transferring the metal from the emitting edge to an emitting end of the nanostructure-containing material, and applying an electric field between the anode base structure and an ion extraction and acceleration electrode sufficient to field emit an electron from the anode base structure

BRIEF DESCRIPTION OF THE DRAWING FIGURES

The objects and advantages of the invention will become apparent from the following detailed description of preferred embodiments thereof in connection with the accompanying drawings in which like numerals designate like elements and in which.

DETAILED DESCRIPTION

Application of nanostructure materials for ion emission may be useful in LMIS applications as well as a range of other applications. Since the discovery of carbon nanotubes (CNT), see, S. Iijima, "Helical microtubules of graphitic carbon", Nature (London) 354, 56 (1991), CNTs have attracted considerable interests in broad electronic areas because of their physical and mechanical properties. Carbon nanotubes are chemically inert, mechanically 100 times stronger than steel in nanometer dimension and have improved stiffness over silicon carbide nanorods. CNTs are able to withstand repeated bending, buckling and twisting, and can conduct electricity as well as copper or semiconductors, like silicon. Nanotubes also transport heat very well. All these attributes make carbon nanotubes a promising candidate for a field emission material.

When an electric field is applied to a nanotube, the field at the nanotube ends can be magnified by $10^3$ to $10^4$ due to the extreme aspect ratio (typical single wall nanotubes have a cross section of 1 nm and length of 10 μm). Thus, under an applied field on the order of V/μm, the effective local field on the nanotube can approach $10^3$–$10^4$ V/μm. If the liquid metal adsorbs/wets on the CNT end, under a high electric field metal atoms can be field ionized and emitted, creating the ion beam thrust.

Carbon nanotube bundles can be intercalated easily by metals, preferably alkali metals like Li, Na, K, Rb, and Cs. See, B. Gao, A. Kleinhammes, X. P. Tang, C. Bower, L. Fleming, Y. Wu, and O. Zhou, "Electrochemical intercalation of single-walled carbon nanotubes with lithium", Chem. Phys. Lett. 307, 153 (1999). The application of nanometer material, especially carbon nanotubes, as an anode component results in a solid state field emission ion source by intercalating alkali metal into the anode carbon nanotube materials. During intercalation, the metal atoms transfer one electron fully to the nanotubes. Thus, nanotube bundles act effectively as ion storage. When the local electric field on the nanotubes approach about $10^3$–$10^4$ V/μm, alkali metal atoms absorbed on the nanotube ends are field ionized and emitted, creating thrust for field propulsion.

In exemplary embodiments, the ion emission electrode, or said base structure anode, is made of and/or covered with conductive material(s) for electric conduction, and can be shaped as a cone, slit, of flat surface on the anode tip. In one embodiment, one nanostructure-containing material is integrated into the top of the anode base which then functions as an emitting edge under an applied electric field. Although depicted herein as being at the top or emitting edge of the anode base, it is to be understood that this represents just one embodiment of the disclosed ion emission device and that other embodiments are within the disclosed embodiments, including positioning the nanostructure-containing material on a portion of the surface of the anode base structure or on an entire surface of the anode base structure or throughout a portion or an entire volume of the anode base structure. The nanostructure-containing material can be any electrically conducting nanotube structure, like single wall carbon nanotube (SWNT), few-walled carbon nanotube (FWNT), multi-walled carbon nanotube (MWNT), carbon fiber, nanotube or nanorod made of a carbon compound, or others.

In another embodiment, besides the conical and edge structure, the anode base can be in flat structure on the top, where the nanostructure-containing material is integrated.

In another embodiment, the nanostructure-containing material or mixture is integrated to the anode base structure by one or a combination of the following methods: electrophoretic deposition, dielectrophoretic deposition, chemical vapor deposition, screen printing, and mechanical method. Some post nanostructure-containing material integration processes, like heat treatment, plasma treatment, chemical treatment, and mechanical treatment, can optionally be applied to the anode base structure to improve mechanical and/or ion emission properties. Mechanical treatment includes tapping, gas blowing, rubbing, brushing, and ultrasonicating. In U.S. Pat. No. 6,277,318, the treatment of a carbon nanotube film surface by blowing, rubbing, brushing and/or ultrasonication in a solvent such as methanol are disclosed.

In still another embodiment, the metal from the metal source, preferably an alkali metal from an alkali metal source, is transferred into the nanostructure-containing material by one or a combination of the following methods: vapor transport, solution, electrochemical reaction, and solid state reaction.

Instead of a liquid metal, a metal in the solid phase can also be supplied to the ion source. The solid metal is optionally melted in the source by a heating fixture during emission. Other methods of solid state transfer include sublimation.

Metal from the metal source reservoir undergoes a two-step transport process. First, metal from the metal reservoir is transferred to the anode base structure and conveyed to the emitting edge of the anode base structure. Second, metal from the emitting edge of the anode base structure is transferred to the tips of the nanostructure-containing material.

For example, metal from the metal source reservoir is transferred to the emitting edge of the anode base structure by any suitable method. For example, the metal in the metal source reservoir can be transferred by capillary action along the surface of the anode base structure, e.g., between the surface of the anode base structure and the surface of the opening in the closure structure. Other methods, include inducing transfer by a difference in chemical potential of the metal between the metal reservoir and the emitting edge of the anode base structure, by a difference in pressure between the metal reservoir and the emitting end of the anode base structure, and/or by the metal migrating under the influence of an applied electrical field, can be used within the exemplary embodiments to transfer metal from the metal source reservoir to the emitting edge of the anode base structure.

For example, metal from the emitting edge of the anode base structure is transferred to the tips or emitting ends of the nanostructure-containing material by any suitable method. For example, transfer can be by intercalation of the metal into the nanostructure-containing material. Further methods include vapor transport, solution transport, electrochemical reaction or solid state reaction. Metal transferred to the emitting ends of the nanostructure-containing material is ionized under an applied electrical field.

In a further embodiment, an ion emission device containing multiple ion sources is provided. The number of active ion sources is selectable by either electric or mechanical switches and enables the ion source to emit over a wide ion current range. This particularly benefits the low/medium emission range in two ways: a) generating stable ion emission current and b) producing better focused emission stream. Switching also allows extraction voltages to be different for different ion sources within the same field emission ion source.

In exemplary embodiments, the anode of a field emission ion source includes an anode structure base and a nanostructure-containing material. The nanostructure-containing material, which is in nanometer or micron dimensions, can be any electrically conducting structure. For example, the electrically conducting structure can be single wall carbon nanotube (SWNT), few-walled carbon nanotube (FWNT), multi-walled carbon nanotube (MWNT), carbon fiber, or a nanotube or a nanorod made of carbon compound. Other nanostructure materials, which are formed from elements other than carbon, such as silicon, germanium, aluminum, silicon oxide, germanium oxide, silicon carbide, boron, boron nitride, and boron carbide, can also be selected for the field emission ion source. Nanostructure materials containing carbon nanotubes are particularly suitable to build the ion source anode in current patent.

Carbon nanotube materials, including single wall, few-walled and multi-walled carbon nanotubes, can be fabricated by numerous methods. The single wall nanotubes can be fabricated using a laser ablation process (For example, A. Thess et al., "Crystalline Ropes of Metallic Carbon Nanotubes," Science 273, 483–487, 1996). Single wall carbon nanotubes can also be fabricated by arc-discharge (For example, T. W. Ebbesen and P. M. Ajayan, "Large Scale Synthesis of Carbon Nanotubes," Nature 358, 220, 1992) and chemical vapor deposition (For example, A. M. Cassell, J. A. Raymakers, J. Kong and H. Dai, "Large scale CVD synthesis of single-walled carbon nanotubes," J. of Physical Chemistry B, 103, 6484, 1999) techniques. Few-walled carbon nanotubes can be fabricated by various methods such as a one-step method for catalyst preparation and process for growth of nanotubes using chemical vapor deposition methods. The combination of the catalysts and growth conditions produce high quality small diameter and few-walled carbon nanotubes. The threshold voltage for field emission of electrons from these materials is lower or similar to the results reported for SWNT bundles. Further, these materials display higher emission current density and better long-term stability than typical SWNT bundles. Another exemplary method of manufacturing few-walled carbon nanotubes comprises the steps of (a) producing a catalyst containing Fe and Mo supported on MgO powder, (b) using a mixture of hydrogen and carbon containing gas as precursors, and (c) heating the catalyst to a temperature above 950° C. to produce a carbon nanotube. These and other methods for few-walled carbon nanotube production are described in U.S. Provisional Patent Application No. 60/531,978 filed Dec. 24, 2003, entitled "METHOD OF SYNTHESIZING SMALL-DIAMETER CARBON NANOTUBES WITH ELECTRON FIELD EMISSION PROPERTIES", the entire contents of which are herein incorporated by reference. Multi-walled carbon nanotubes can be fabricated by arc method (For example, S. Iijima, "Helical microtubules of graphitic carbon", Nature 354, 56, 1991) and chemical vapor deposition (For example, M. Endo, K. Takeuchi, S. Igarashi, K. Kobori, M. Shiraishi, H. W. Kroto, "The production and structure of pyrolytic carbon nanotubes (PCNTS)", J. Phys. Chem. Solids, 54, 1841, 1993).

As-grown CNT materials can be optionally purified by a suitable purification process. For example, the nanotube material can be placed in a suitable liquid medium, such as an organic solvent, preferably an alcohol such as methanol. The nanotubes are kept in suspension within the liquid medium for several hours using a high powered ultrasonic horn, while the suspension is passed through a micro porous membrane. In another example, the carbon nanotube containing material is first purified by reflux in a suitable solvent, preferably 20% $H_2O_2$ with subsequent rinsing in $CS_2$ and then in methanol, followed by filtration as described in U.S. Pat. No. 6,280,697.

Carbon nanotube materials can be grown directly on the anode base structure by chemical vapor deposition (CVD). Nanostructure materials containing carbon nanotubes can also be integrated into the anode base structure after nanotube fabrication by various techniques, such as electrophoretic methods, dielectrophoretic methods, screen printing methods, and mechanical methods. Two particularly useful techniques include the electrophoretic method (For example, B. Gao, G. Z. Yue, Q. Qiu, H. Shimoda, and O. Zhou, "Fabrication and electron field emission properties of carbon nanotube films by electrophoretic deposition", Adv. Mater., 13(23), 1770, 2001) and the dielectrophoretic method (J. Tang, B. Gao, H. Geng, O. D. Velev, L. C. Qin, and O. Zhou, "Assembly of 1D nanostructures into sub-micron diameter fibrils with controlled and variable length by dielectrophoresis", Adv. Mater. 15(15), 1352, 2003.).

Carbon nanotube containing materials (CNT materials) can be deposited on conducting substrates of various structures by electrophoretic deposition (EPD) through a two-steps process. In the first step, CNT materials suspended in a liquid are charged and move toward an electrode (ion source anode) under an electric field applied (≈200 V/cm to 500 V/cm). In the second step, the CNT materials accumulate at the electrode and form a coherent deposition on the surface.

A dielectrophoresis method manipulates, aligns and assembles one-dimensional nanostructures, like carbon nanotubes, applying an alternating-current electric field to an electrode (ion source anode). Pre-formed carbon nanotubes dispersed in water are assembled into micro-electrodes and sub-micron diameter fibrils with variable lengths from approximately 1 μm to over 1 cm. The carbon nanotubes within the fibril are bonded by van der Waals force and are aligned along the fibril axis. The method affords fine control of the fibril length and is capable of parallel fabrication of many fibrils using the same source.

After the integration of nanostructure-containing materials into the ion source anode, some post treatment processes, like heat treatment, plasma treatment, chemical treatment, and mechanical treatment, can optionally be applied to the ion source anode to improve the anode physical, chemical and mechanical performance. One common post treatment process includes annealling the anode under high temperature to form strong nanostructure material-substrate bonding. The plasma treatment is mainly used to improve the ion emission performance. After the plasma treatment, structural performance of nanostructure materials such as length, opening, distribution and composition can be modified.

Figure 1:
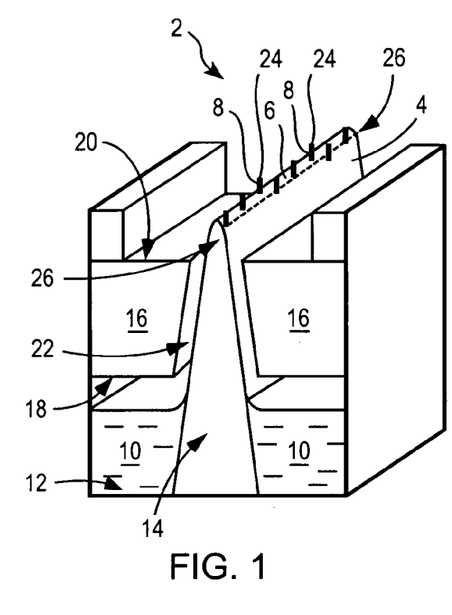
FIG. 1 shows an embodiment of a field emission ion source with a base structure anode with nanostructure-containing materials on an emitting edge, a metal source storage reservoir, and a metal transport slit structure.

Different structures of the field emission ion source are encompassed within the disclosure. For example, the anode base structure may be formed in any suitable manner, as shown in FIG. 1 to FIG. 7. It is known to form field emitting anodes with various geometrical configurations, such as one or more sharp conical conductive tips and sharp edges. FIG. 1 shows one field emission ion source 2 using anode base structure 4. Nanostructure-containing material 8 is integrated into the anode base structure at an emitting edge 6. The length of the edge 6 is decided by the ion current desired and basically any length is possible. Further, the edge 6 can be any geometric shape including a curved surface. A liquid metal 10, such as cesium, indium, or alloys or compounds of these metals or other Group III and IV elements, alloys and compounds, is constrained inside a liquid metal source reservoir 12. A metal ion supplying edge 14 of the anode base structure 4 contacts the liquid metal 10 in the metal source reservoir 12, e.g., is immersed in the reservoir.

A closure element 16 is placed over the metal source reservoir 12 with a first side 18 towards the metal source reservoir 12 and a second side 20 away from the metal source reservoir 12. The closure element 16 has an opening from the first side 18 to the second side 20. Metal is transferred from the metal reservoir 12 to the emitting edge 6 of the anode base structure 4 through the narrow space 22 formed by the anode base structure 4 and the closure element 16. The metal at the emitting edge 6 is then intercalated or otherwise taken up by the nanostructure-containing material 8 and moved to a distal end 24 of the nanostructure-containing material, e.g., to an exposed tip of the carbon nanotube. The height of the closure element 16 and width of the narrow space 22 are decided by the requirements of liquid supply and the confinement of liquid metal inside the metal source reservoir 12.

The nanostructure-containing material can improve the ion emission performance, i.e., reduce the voltage of ion field emission, and stabilize the ion emission current. The nanostructure-containing material can include single wall carbon nanotubes, bundles of single wall carbon nanotubes, few-walled carbon nanotubes, multi-walled carbon nanotubes, bundles of multi-walled carbon nanotubes, carbon fibers, nanotubes, nanowires and nanorods of carbon. In addition, the nanostructure-containing material can include nanowires comprising at least one field emitting material selected from the group consisting of silicon, germanium, carbon, oxygen, indium, cadmium, gallium, an oxide, a nitride, a silicide and a boride.

Figure 2:
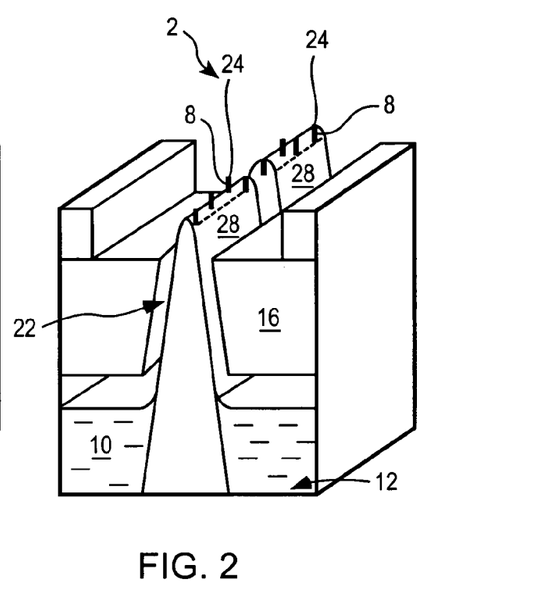
FIG. 2 shows an embodiment of a field emission ion source having multiple base structure anodes with nano-structure-containing materials on emitting edges, a metal source storage reservoir, and a metal transport slit structure.
Figure 3:
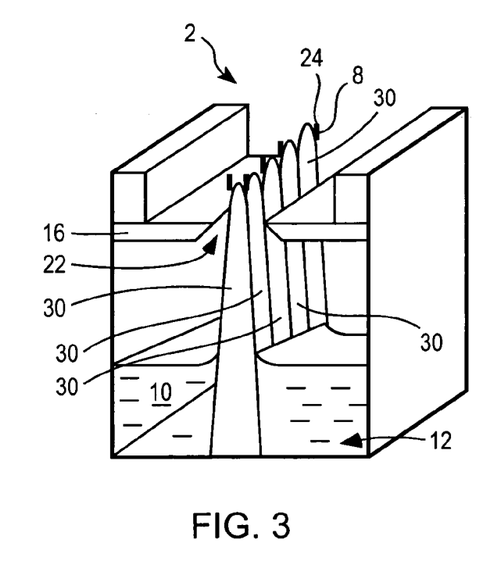
FIG. 3 shows an embodiment of a field emission ion source with base structure anodes in the form of one or multiple conical tips with nanostructure-containing materials on an emitting edge, a metal source storage reservoir, and a metal transport structure.

Numerous variations of the anode base structure are envisioned. For example, to increase the emission uniformity, the anode base structure can be an edge array structure consisting of multiple short edge bases 28, as shown in FIG. 2. FIG. 3 shows the anode base structure includes conical tip anode base structures 30. The number of conical tip anode base structures 30 and the distance between conical tip anode base structures 30 is determined by, for example, the emission current and liquid metal supply requirements. The conical tip anode base structure 30 can be surrounded by a circular channel, narrow slit, or other structures in the closure element 16.

Figure 4:
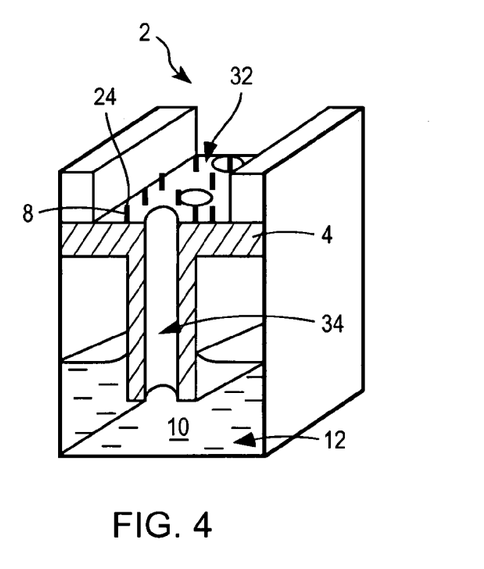
FIG. 4 shows an embodiment of a field emission ion source with a flat base surface anode with nanostructure-containing materials on the flat emitting edge surface, a metal source storage reservoir, and a metal transport capillary structure.

Anodes can be built into a sharp apex structures (e.g., knife edges, conical edge, a plurality of knife edges or a plurality of conical edges with the nanostructure-containing material protruding therefrom) to generate enhanced fields to extract ions. Taking advantage of the nanometer to micron dimension of the nanostructure-containing materials, the top of the anode base can be flat with an array (ordered or disordered) of nanostructures protruding from the surface. FIG. 4 shows an exemplary embodiment of a flat anode base structure design, in which liquid metal is transferred to the surface 32 of the flat anode base structure 4 through a metal source transfer path 34, such as a capillary tube. The liquid metal pools on the surface and is intercalated into the nanostructure-containing materials 8 on the surface 32 and transferred to the emitting end 24 of the nanostructure-containing materials 8. Other metal source transfer paths, such as a slit, can also be selected.

Figure 5:
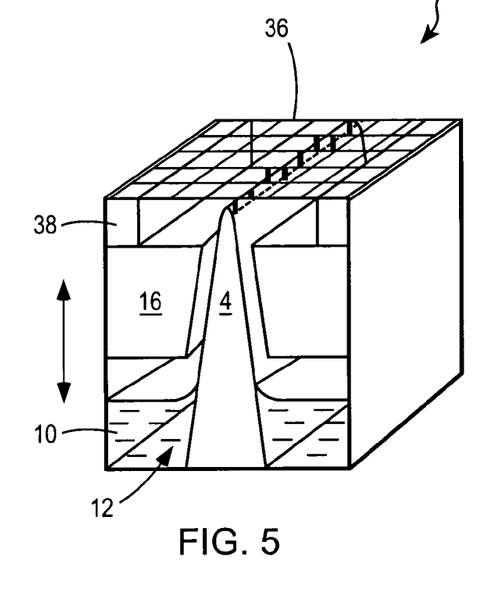
FIG. 5 shows an embodiment of a field emission ion source with a mesh structure ion extraction electrode.
Figure 6:
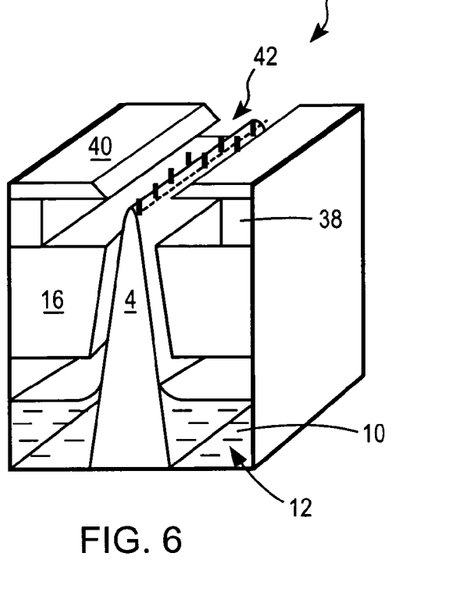
FIG. 6 shows an embodiment of a field emission ion source with an open slit ion extraction electrode.

Exemplary field emission ion sources also include an ion extraction and acceleration electrode (cathode) used to apply negative potentials corresponding to the anode to produce ion emission. The extraction electrode can be included in any suitable field emission ion source structure disclosed herein. For example, FIG. 5 shows the application of a mesh structure 36 as an extraction electrode, which is supported and separated from the anode base structure 4 by spacer 38. The mesh structure 36 can be metal or other conductive materials with a desirable opening and mechanical strength. In another example, FIG. 6 shows a slit extraction electrode structure 40. The open width of the slit 42 and the cathode-to-anode distance influence the ion emission performance and can be optimized according to application requirements. Other extraction electrode structures, like a flat plate with circular holes, can also be used.

Figure 7:
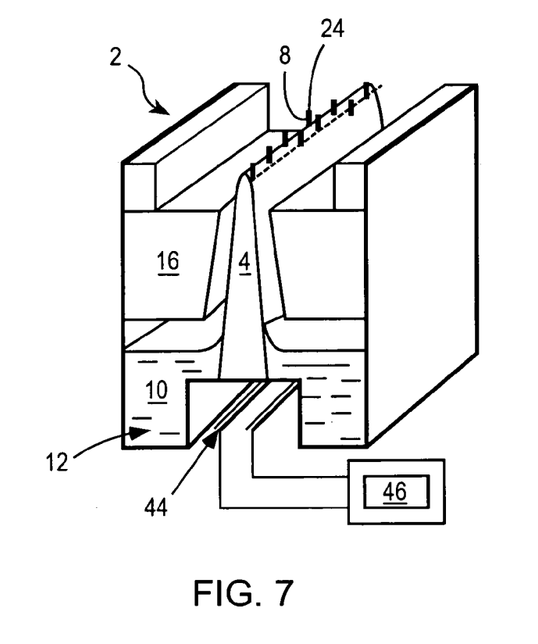
FIG. 7 shows an embodiment of a field emission ion source with a heating fixture for the metal source storage reservoir.

Typically, the metal in the metal source reservoir will be in a liquid state at room temperature. However, some metals which are in the solid state under room temperature can also be used. To transfer theses solid metals to the anode emitting edge and to generate high ion emission currents, a heating fixture liquefies the metal in the metal source reservoir. FIG. 7 shows an example of a field emission ion source 2 with heating fixture 44 and power supply 46. The heating fixture 44 can be in different designs, such as a resistant filament heater, heating tapes, and radio frequency (RF) radiation heater, so long as the heating fixture 44 is in thermal communication with the metal source reservoir 12 sufficient to transform at least a portion of the metal in the metal source reservoir 12 to the liquid state. The heating fixture should be designed in the manner that can supply adequate heat to both the metal source and the anode. If necessary, the heating fixture should be able to supply heat separately to the metal source and the source anode. Other methods to transform at least a portion of the metal in the metal source reservoir 12 to the liquid state can be used, including sublimation.

The field emission ion source may also transfer metal, preferably alkali metal, into the nanostructure-containing material by one or a combination of the following intercalation methods: vapor transport, solution transport, electrochemical reaction, and/or solid state reaction. The metal can be transformed into the nanostructure-containing material by vapor transport in any of the ion source structures described in FIG. 1 to FIG. 7. When the ion source is operated under this mode, components for vapor transport intercalation, such as a heating fixture, are present in the field emission ion source. A solid reservoir and/or a reservoir containing solid metal can be used in any of the exemplary embodiments pictured and discussed herein.

Figure 8:
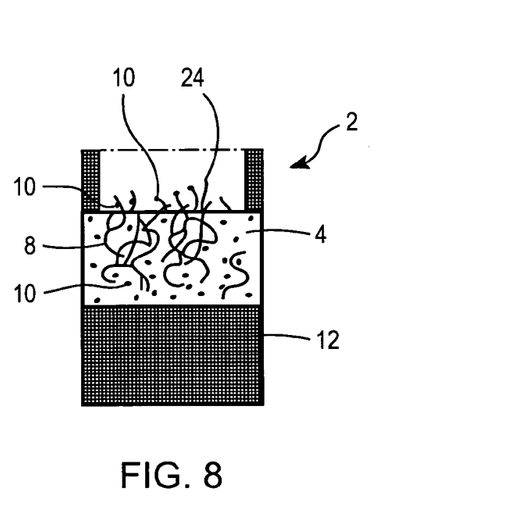
FIG. 8 shows an embodiment of a field emission ion source including an intermediate material for intercalation of alkali metal into the nanostructure-containing materials.

FIG. 8 shows a cross-section of an exemplary field emission ion source 2 for electrochemical intercalation of metal 10 into the nanostructure-containing material 8. In this design, an electrochemical structure, such as a Swagelok-type cell disclosed in D. Guyomard, J. M. Tarascon, J. Electrochem. Soc. 139, 937 (1992), can be used with the metal source and the nanostructure-containing material as the two electrodes, and an electrolyte as the intermediate transformation material.

Figure 9:
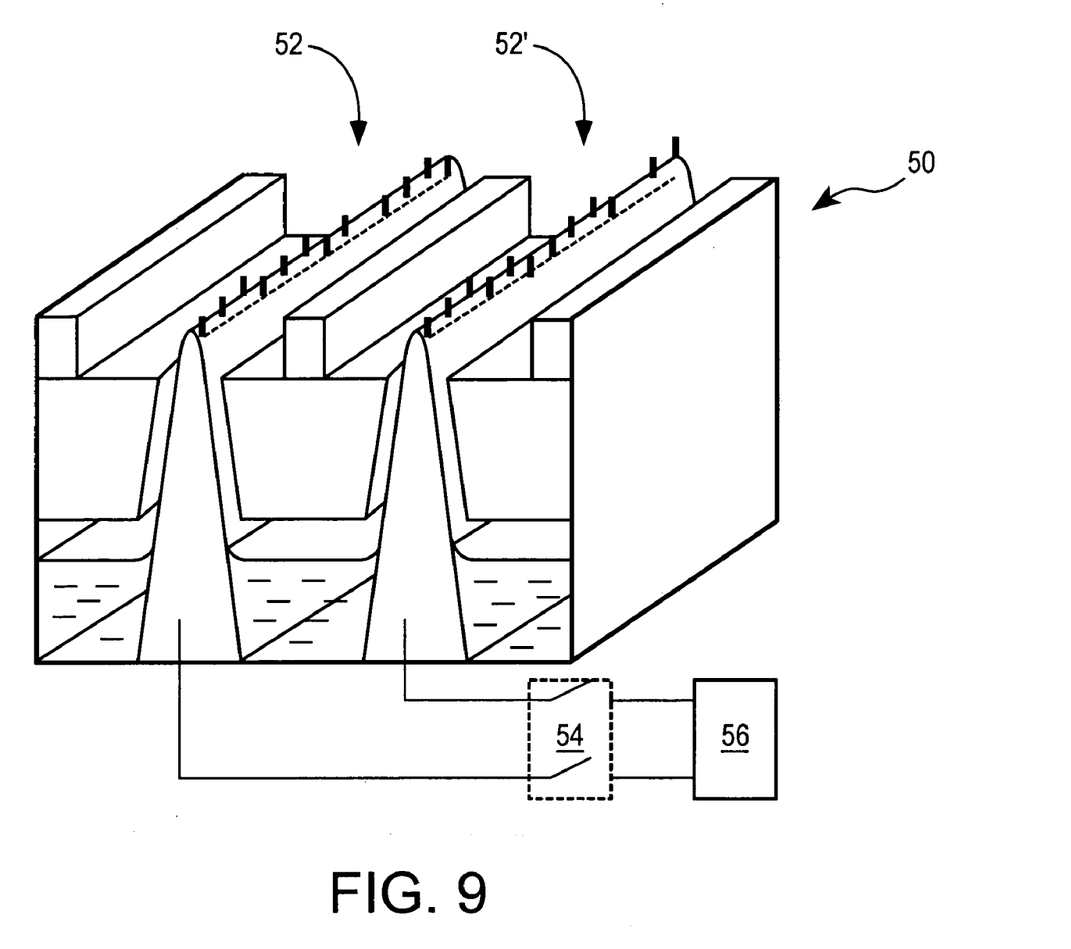
FIG. 9 shows an embodiment of a field emission ion source device with two field emission ion sources and a switch/control component capable of controlling the number of the ion sources.

A field emission ion source device can comprise multiple field emission ion sources. FIG. 9 shows a field emission ion source device 50 constructed from two field emission ion sources 52, 52'. At least some, preferably all, of the individual field emission ion sources 52, 52' are consistent with the exemplary embodiments of field emission ion sources disclosed and described herein. For example, the field emission ion sources 52, 52' can be any one of the embodiments disclosed and described in connection with FIGS. 1 to 7. The working sources and the extraction potential for each source can be selectable through a switch/control component 54 and a power supply unit 56. The capability of selecting the number and location of the ion source can improve low/medium thrust range operations of LIMS. For example, improvement may be observed in a) generating stable ion emission and b) producing better focused ion beams. The operation of ion sources under different extraction potentials may generate various space ion current distributions and profiles for special requirements.

EXAMPLE 1

An field emission ion source integrating carbon nanotube materials into the anode base structure according the present disclosure has significantly higher ion emission capability than conventional ion sources. In one example, an ion source with a conical tungsten tip of 6 micron in diameter served as the anode base structure. Single wall carbon nanotube materials, which were fabricated using the laser ablation method, were deposited on top of the tungsten tip by the electrophoretic deposition (EPD). After the deposition, the CNT film was annealed under high temperature to form strong nanotube-substrate bonding. The extraction potentials were applied through a mesh cathode which was placed 0.3 mm above the emitting edge of the anode base structure. As a comparison, an ion source was built under the same structural dimensions without applying carbon nanotube materials to the anode base structure. Cesium was used as the liquid metal. The cesium ion emissions were tested for both ion sources in the same vacuum system under the same vacuum ($10^{-7}$ Torr) and operational conditions.

Figure 10:
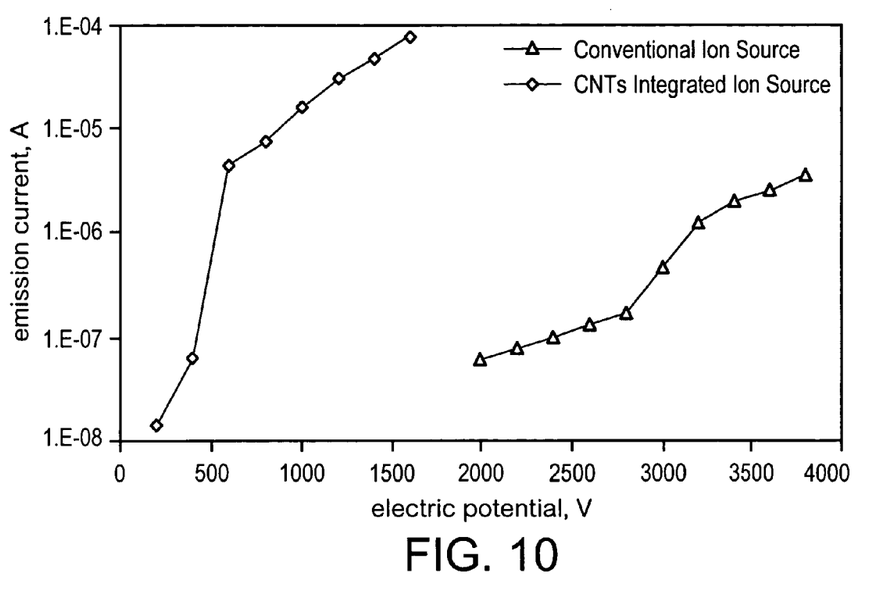
FIG. 10 shows results of comparison tests of cesium emission from a carbon nanotube integrated tip anode ion source according to the principles disclosed herein and a conventional tip anode ion source.

FIG. 10 shows the ion emission current-voltage performance for both sources (-○-=field emission ion source with carbon nanotube material; -Δ-=field emission ion source without carbon nanotube material). For the field emission ion source with carbon nanotube material, cesium emission started at low voltages with turn-on voltage (under 0.5 µA current) of 0.5 kV corresponding to an applied electric filed of about 1.7 V/µm ((0.2 V/µm). Emission current of 78 µA was achieved under a voltage of 1.6 kV, corresponding to an applied electric filed of about 5 V/µm ((0.2 V/µm). Comparing cesium emission from the field emission ion source with carbon nanotube material to the source without carbon nanotube materials, the emission voltages dropped by a factor of about 6 to 10 under the same emission currents.

Figure 11:
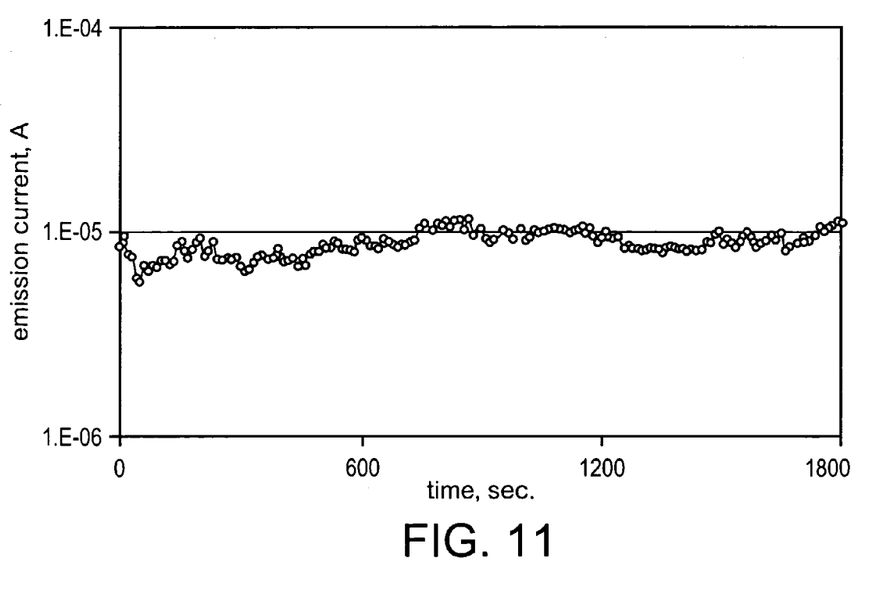
FIG. 11 illustrates the stability ion of emissions from a carbon nanotube integrated ion source as described in FIG. 10.

The carbon nanotube integrated field emission ion source also showed stable ion emission performance. FIG. 11 shows the result of an ion emission stability test. In the half hour continuous test under a 10 µA current, the current fluctuation was smaller than 20% without current degradation. Incorporation of an electric feedback circuit would be able to stabilize the emission to 1% level.

A method of forming a field emission ion source is provided. The method comprises forming an anode base structure containing a nanostructure-containing material, the anode base structure including an emitting edge and a metal ion supplying edge and the nanostructure-containing material integrated into at least the emitting edge and positioning the anode base structure in a housing, the housing including a metal source reservoir for a metal and a closure element over the metal source reservoir with a first side of the closure element towards the metal source reservoir, a second side of the closure element away from the metal source reservoir and an opening in the closure element from the first side to the second side, wherein the anode base structure is positioned such that the anode base structure passes through the opening in the closure element with the metal ion supplying edge in intercalation contact with the metal in the metal source reservoir and with the emitting edge protruding past the second side of the closure element. The nanostructure-containing material intercalates metal from the metal source reservoir and transfers the metal to the emitting edge of the anode base structure.

Integrating the nanostructure-containing material into at least the emitting edge includes integrating by electrophoresis, dielectrophoresis, chemical vapor deposition, screen printing or a mechanical method.

The method optionally comprises placing a heating fixture in thermal communication with the metal source reservoir to transform at least a portion of the metal in the metal source reservoir to a liquid state.

The method of forming a field emission ion source additionally comprises placing an ion extraction and acceleration electrode across and separated from the emitting edge of the anode base structure and applying a post-integration process to the anode base structure, the post integration process including heat treatment, plasma treatment, chemical treatment or mechanical treatment.

A method of field emitting an ion from a field emission ion source is provided. The method comprises transferring a metal from a liquid metal reservoir in contact with a metal supplying edge of an anode base structure and transporting the metal to an emitting edge of the anode base structure by intercalation of the metal within a material of the anode base structure, wherein a nanostructure-containing material is integrated into at least the emitting edge. An electric field is applied between the anode base structure and an ion extraction and acceleration electrode sufficient to field emit an electron from the anode base structure. The emitting edge is addressable to control the number and the location of ion emission from the emitting edge. Addressability can be by an electrically operated controller or by a mechanically operated controller. In exemplary methods, at least two locations are individually addressable to apply a first emission potential to a first location and a second emission potential to a second location, the first potential different from the second potential.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A field emission ion source, comprising:
a metal source reservoir containing a metal;
a closure element over the metal source reservoir with a first side towards the metal source reservoir, a second side away from the metal source reservoir and an opening from the first side to the second side; and
an anode base structure including an emitting edge and a metal ion supplying edge, at least the emitting edge including a nanostructure-containing material,
wherein the metal from tile metal source reservoir is transferred to the emitting edge of the anode base structure and is further transferred to an emitting end of the nanostructure-containing material to be ionized.

2. The field emission Ion source of claim 1, wherein transferring to the emitting end includes vapor transport, solution transport, electrochemical reaction or solid state reaction.

3. The field emission ion source of claim 1, wherein the anode base structure passes through the opening from the first side of the closure element to the second side of the closure element with the metal ion supplying edge in contact with the metal in the metal source reservoir and the emitting edge extending beyond the second side.

4. The field emission ion source of claim 1, wherein the emitting edge is a knife edge, a conical edge, a plurality of knife edges or a plurality of conical edges with the nanostructure-containing material protruding therefrom.

5. The field emission ion source of claim 4, wherein the field emission ion source includes a capillary, the capillary in liquid metal transporting contact between the metal in the metal reservoir and the emitting edge.

6. The field emission ion source of claim 1, wherein the emitting edge is a planar surface with the nanostructure-containing material protruding therefrom.

7. The field emission ion source of claim 6, wherein the field emission ion source includes a capillary, the capillary in liquid metal transporting contact between the metal in the metal reservoir and the emitting edge.

8. The field emission ion source of claim 1, wherein the emitting edge is addressable to control the number and the location of ion emission from the emitting edge.

9. The field emission ion source of claim 8, wherein the emitting edge is addressable by an electrically operated controller.

10. The field emission ion source of claim 8, wherein the emitting edge is addressable by a mechanically operated controller.

11. The field emission ion source of claim 8, wherein at least two locations are individually addressable to apply a first emission potential to a first location and a second emission potential to a second location, the first emission potential different from the second emission potential.

12. The field emission ion source of claim 8, wherein at least two locations are individually addressable to apply a first emission potential to a first location and a second emission potential to a second location, the first emission potential substantially the same as the second emission potential.

13. The field emission ion source of claim 1, wherein the metal in the metal source reservoir is in a liquid state and the metal is transferred to the emitting edge of the anode base structure in the liquid state.

14. The field emission ion source of claim 1, comprising a heating fixture in thermal communication with the metal source reservoir to transform at least a portion of the metal in the metal source reservoir to the liquid state.

15. The field emission ion source of claim 1, comprising an ion extraction and acceleration electrode, the ion extraction and acceleration electrode applying a negative potential to the anode base structure sufficient to emit an ion from the emitting edge.

16. The field emission ion source of claim 15, wherein the ion extraction and acceleration electrode is a mesh structure separated from the anode base structure, the mesh structure having a plurality of openings.

17. The field emission ion source of claim 16, wherein the mesh structure is a metal or a conductor.

18. The field emission ion source of claim 15, wherein the ion extraction and acceleration electrode is a slit structure separated from the anode base structure, the slit structure having a slit opening corresponding to the emitting edge of the anode base structure.

19. The field emission ion source of claim 18, wherein the slit structure is a metal or a conductor.

20. The field emission ion source of claim 15, wherein the ion extraction and acceleration electrode is a flat plate separated from the anode base structure, the flat plate having a plurality of openings.

21. The field emission ion source of claim 20, wherein the flat plate structure is a metal or a conductor.

22. The field emission ion source of claim 1, wherein the nanostructure-containing material includes single wall carbon nanotubes and bundles of single wall carbon nanotubes.

23. The field emission ion source of claim 1, wherein the nanostructure-containing material includes multi-walled carbon nanotubes and bundles of multi-walled carbon nanotubes.

24. The field emission ion source of claim 1, wherein the nanostructure-containing material includes few-walled carbon nanotubes and bundles of few-walled carbon nanotubes.

25. The field emission ion source of claim 1, wherein the nanostructure-containing material includes carbon fibers.

26. The field emission ion source of claim 1, wherein the nanostructure-containing material includes nanotubes, nanowires and nanorods of carbon.

27. The field emission ion source of claim 1, wherein the nanostructure-containing material includes nanowires, the nanowires comprising at least one field emitting material selected from the group consisting of silicon, germanium, carbon, oxygen, indium, cadmium, gallium, an oxide, a nitride, a silicide and a boride.

28. A field emission ion source device, comprising a plurality of field emission ion sources according to claim 1.

* * * * *

UNITED STATES PATENT AND TRADEMARK OFFICE
CERTIFICATE OF CORRECTION

| | | |
|---|---|---|
| PATENT NO. | : 7,129,513 B2 | Page 1 of 1 |
| APPLICATION NO. | : 10/858436 | |
| DATED | : October 31, 2006 | |
| INVENTOR(S) | : Otto Z. Zhou et al. | |

It is certified that error appears in the above-identified patent and that said Letters Patent is hereby corrected as shown below:

Col. 1, line 10,
    This patent is completed through a project funded by NASA. After communications with NASA official and USPTO specialist, we are recommended to insert the following language
    --This invention was made with Government support under contract number NNA06BA23C awarded by NASA. The Government has certain right in the invention.--

Signed and Sealed this

Twenty-second Day of May, 2007

JON W. DUDAS
*Director of the United States Patent and Trademark Office*